United States Patent

[11] 3,588,817

| [72] | Inventor | Joseph F. Gazzo<br>1303 McKinley Ave., Des Moines, Iowa 50315 |
|---|---|---|
| [21] | Appl. No | 781,301 |
| [22] | Filed | Dec. 2, 1968 |
| [45] | Patented | June 28, 1971<br>Continuation-in-part of application Ser. No. 599,623, Dec. 6, 1966, now abandoned. |

[54] PLURAL SIGNAL VEHICLE LIGHT SIGNALLING SYSTEM
10 Claims, 11 Drawing Figs.
[52] U.S. Cl........................................... 340/87, 340/89, 340/94
[51] Int. Cl....................................... H04q 5/36, H04q 5/38
[50] Field of Search........................................ 340/87, 89, 94

[56] References Cited
UNITED STATES PATENTS

| 2,201,795 | 5/1940 | Schnurpfeil | 340/87 |
| 2,336,905 | 12/1943 | Welsh | 340/87 |
| 2,399,057 | 4/1946 | Partridge | 340/87 |
| 2,586,643 | 2/1952 | Garlow | 340/87 |
| 2,912,675 | 11/1959 | Habsburg-Lothringen | 340/87 |

*Primary Examiner*—Harold I. Pitts
*Attorney*—Zarley, McKee and Thomte

ABSTRACT: A signalling unit for mounting on top of a vehicle including a trio of lights visible from any point near the vehicle. The outer wing lights are operatively connected to the brake and turn signal circuitry while the center lights are connected to the ignition system. The outer wing lights are carried on wings extending upwardly, outwardly and rearwardly of the center light unit thereby giving emphasis to each of the lighting units at any point around the vehicle.

Patented June 28, 1971
3,588,817
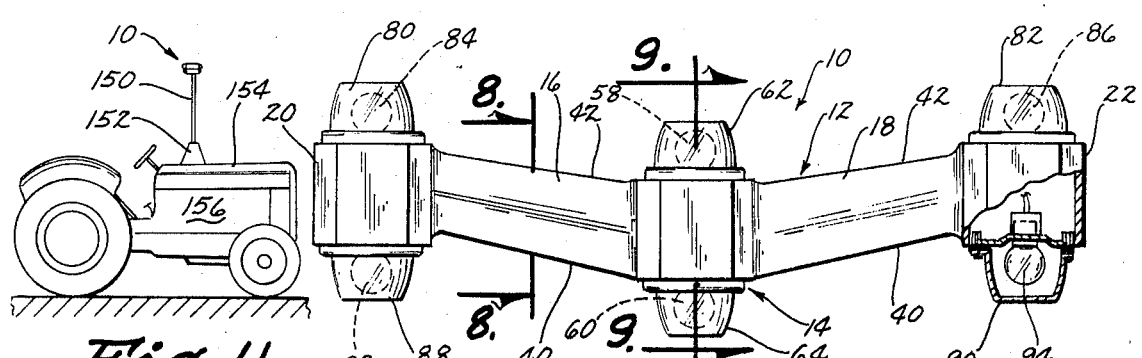
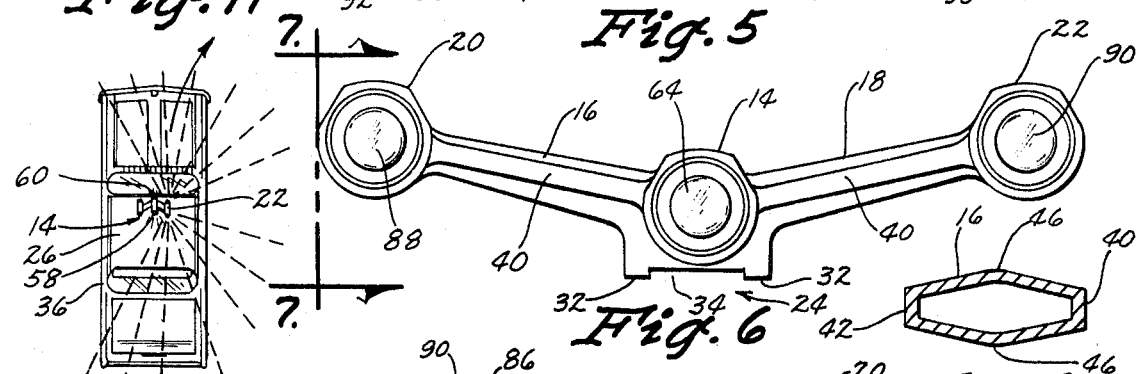
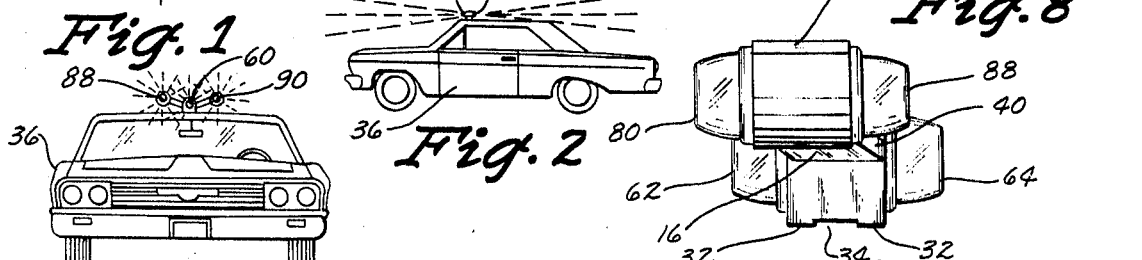
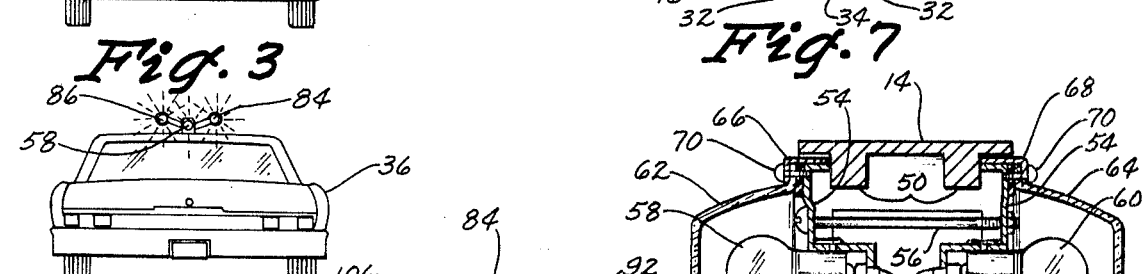
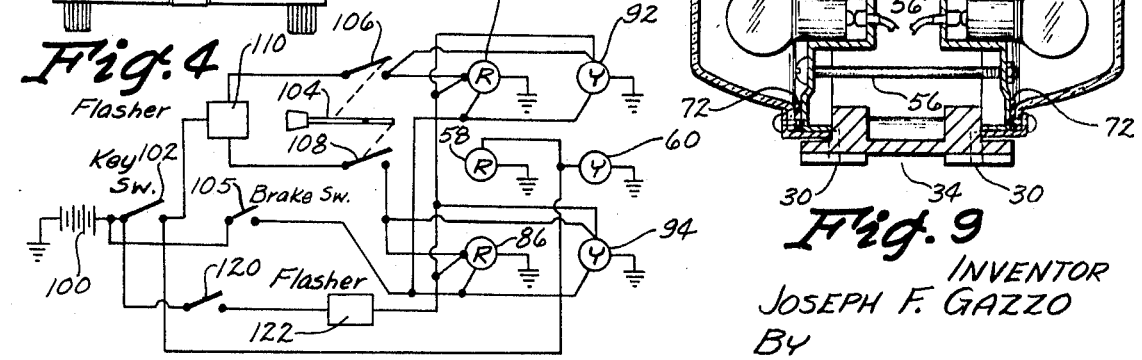
INVENTOR
JOSEPH F. GAZZO
BY
Zarley, McKee & Thomte
ATTORNEYS

PLURAL SIGNAL VEHICLE LIGHT SIGNALLING SYSTEM

This is a continuation-in-part application of my copending application, Ser. No. 599,623 filed Dec. 6, 1966 now abandoned.

One of the greatest causes of accidents on our streets and highways is the inability or failure of vehicles to communicate to others around them. The third car in a line of traffic does not know when the first car is beginning to stop since the driver of the third car cannot see the conventional tail lights on the first car since they are hidden by the second car. Since conventional turn signalling lights on cars are located on the ends of the cars persons at the sides of the cars cannot know the intentions of the driver regarding turning or stopping. Oncoming cars have no way of indicating to other drivers their intention to slow down or stop.

The lack of concentration of drivers while looking at the tail lights of an automobile result in drivers seeing but not knowing what they see. This in part is caused by the fact that tail lights on most automobiles are spaced substantially apart at the corners of the rear end of the car and thus require a greater span of concentration than many drivers normally give to the car ahead of them.

Tractors and other farm equipment on highways have always been involved in various accidents because they lack identification and are slow moving.

The signalling system of this invention is designed to maximize communication of driver intentions to other drivers. The trio of lights are mounted in a spot on the forward end of the automobile roof where they will be visible to all people looking at the automobile from any point around the vehicle. Everyone will be able to tell exactly what the driver of the car is doing at any given moment because all lights will be exposed. Special emphasis are given to the trio of lights by mounting wings on a center light unit and having the wings extend upwardly, rearwardly and outwardly. Thus when a person views the trio of lights from the side of the automobile the wing lights are set apart from the center running lights and thus become readily distinguishable therefrom. If the lights were mounted in a single horizontal plane, they would have a "sameness" appearance to them that would diminish their signalling ability as well as at times cause the wing lights to obstruct the view of the center running lights.

The signalling lights of this signalling system indicate forwardly and rearwardly through the wing light units the turning of the vehicle as well as the stopping since the turn signals and brake circuitry are coupled into the wing unit lights for forward and rearward signalling. The center forward and rearward lights function as running lights and indicate that the car is operating since they are connected to the ignition system of the automobile.

The housing for the trio of lights is streamlined in appearance and is unitary in construction and thus contributes greatly to ease of recognition of the individual lights in the trio of lights.

The signalling system of this invention may be mounted on any type of vehicle and is particularly well suited for use on tractors. It has been found that mounting the unit atop of a standard affixed to the hood of the tractor serves to warn drivers from substantial distances forward and rearwardly of the tractor on a highway of the presence of the tractor such that precautionary steps may be taken to avoid an accident. This is particularly useful when the tractor is hidden from view by the top of a hill. The signalling light being high above the tractor gives the fast moving cars forwardly or rearwardly early warning of the tractor's presence and thus plenty of time to slow down and avoid hitting the tractor.

These and other features and advantages of this invention will become readily apparent to those skilled in the art upon reference to the following description when taken into consideration with the accompanying drawings, wherein:

FIG. 1 is a top plan view of a passenger automobile having the signalling system of this invention mounted on the forward end of the roof;

FIG. 2 is a side elevation view of an automobile having the signalling system of this invention;

FIG. 3 is a front elevation view;

FIG. 4 is a rear elevation view;

FIG. 5 is a top plan view of the light signalling unit only;

FIG. 6 is a front elevation view;

FIG. 7 is an end elevation view taken along line 7-7 in FIG. 6;

FIG. 8 is a cross-sectional view taken along line 8-8 in FIG. 5;

FIG. 9 is a cross-sectional view taken along line 9-9 in FIG. 5;

FIG. 10 is an electrical schematic; and

FIG. 11 is a side elevation view of a tractor having the signalling system mounted thereon.

The signalling system of this invention is referred to generally in FIG. 5 by the reference numeral 10 and includes a unitary housing 12 having a center pod 14 with oppositely extending wings 16 and 18 and wing pods 20 and 22 mounted thereon at the outer ends thereof.

It is seen in FIG. 5 that the wings 16 and 18 extend outwardly, upwardly and rearwardly from the center pod 14. The housing 12 is formed from any suitable material such as aluminum and may be cast into a single piece. The wings 16 and 18 are hollow in construction as seen in FIG. 8 to provide lightness in weight for the total unit and also to provide passageways for communication between the center pod 14 and the outer pods 20 and 22. The center pod 14 includes a base 24 for mounting to the top roof 26 of an automobile as seen in FIGS. 1—4 by the use of any suitable means such as adhesive or bolts through the roof 26 and received in screw openings 30 (FIG. 9). The base 24 is provided with four corner located feet 32 with space 34 therebetween. The feet 32 permit the base to readily matingly engage any mounting support structure such as the roof 26 of an automobile 36.

The wings 16 and 18 in cross section are seen to have an aerodynamic design. The leading and trailing edges 40 and 42 respectively meet at the center 46 along a longitudinal line wherein the wings have their greatest thickness.

It is further seen that each of the pods 14, 20 and 22 have a similar design and appearance and the wings and wing pods are symmetrical in their arrangement.

As seen in FIG. 9 the center pod 14 like the wing pods 20 and 22 have a longitudinal opening from front to rear therethrough with inwardly projecting annular shoulders 50 spaced apart and set inwardly from the outer front and rear peripheral edges for engagement by light brackets 52 and 54 interconnected by bolts 56. Light bulbs 58 and 60 are conventionally secured to the light brackets 52 and 54 and lenses 62 and 64 extend over the bulbs and are secured in place by retaining clamps 66 and 68 held in place by screws 70 engaging the light brackets 52. A sealing element 72 is provided between the lenses 62 and 64 and the light brackets 52.

The light unit for the wing pods 20 and 22 are similar in construction to the light unit in the center pod 14 as illustrated in FIG. 9. A pair of rearwardly extending lenses 80 and 82 are provided over double filament bulbs 84 and 86 while forwardly projecting lenses 88 and 90 cover double filament bulbs 92 and 94. The three rear lenses 62, 80 and 82 are preferably red while the front lenses 88, 64 and 90 are yellow.

The electrical schematic as shown in FIG. 10 supplements the conventional turn signal circuitry, brake light circuitry and safety flasher circuitry. A battery 100 is connected through the ignition switch 102 to the turn signal lever 104 and the foot brake 105. The turn lever 104 actuates left and right turn signal switches 106 and 108 which in conjunction with the flasher 110 cause the left turn lights 84 and 92 to blink on and off when turning left and the right lights 86 and 94 to blink on and off when turning right. When the brake switch 106 is actuated by operation of the brake on the car the second filament of the four lights 84 and 92, 86 and 94 are turned on. Alternatively, the safety flasher switch 120 may be actuated and through the flasher 122 the four lights will also be actuated to a flashing condition.

The running lights 58 and 60 in the center pod 14 are connected for operation to the ignition key switch 102 and thus are activated at all times when the ignition switch is in the on position.

In FIG. 1 the right turn signals are on and thus the forward and rear lights 86 and 94 are flashing as indicated by the radiating dash lines coming from the right wing pod 22. The center wing pod 14 shows light being radiated forwardly and rearwardly since the ignition key is on and thus the running lights 58 and 60 are on. In FIG. 3 the forward end of the automobile is visible and indicates the running lights are on as seen by the center forward light 60. Also the car is being either braked or the safety flasher has been actuated since the forward wing lights 88 and 90 are on as indicated by the radiating lines in FIG. 3. Similarly in FIG. 4 viewing the car from the rear it is seen that the rear lights 86 and 84 are on along with the rear running light 58.

In FIG. 2 the car is viewed from the side and the left forward and rear lights 90 and 86 are seen as being illuminated due to the radiating lines extending therefrom.

The signalling unit of this invention may be mounted on any type vehicle and a second alternate embodiment is shown in FIG. 11 wherein the signalling unit 10 is mounted on a post 150 supported by a base 152 secured to the hood 154 of a tractor 156. It is seen that the signalling unit 10 extends well above the top of the tractor and thus will be visible from long distances in any direction.

Thus it is seen that the signalling system of this invention provides complete information as to what the driver is doing or going to do such that people all around him may be completely informed and thereby can take appropriate steps to avoid needless accidents. Each of the three light units are individually and distinctively exposed for easy viewing by their arrangement and positioning in the streamlined housing mounting the light units in an easily viewed position on the forward top end of a vehicle roof top.

The lens colors may vary as desired or required by law such as blue or green to the rear. It is apparent that the light signalling system of this invention may be used on other vehicles not shown including water craft, trucks, motorcycles and bicycles.

I claim:

1. A vehicle having a light signalling system, said light signalling system comprising:

a housing including a center light unit, and outer wing light units mounted closely adjacent said center light unit, and each of said center and wing light units having forwardly and rearwardly facing signal lights, and each of said signal lights being exposed and visible laterally from opposite sides respectively thereof, said signal lights of the wing light units being operatively connected to the turn signal and brake circuitry of the vehicle to indicate forwardly, rearwardly and laterally intentions to turn and stop, and said signal lights of the center light unit being operatively connected to the ignition switch of the vehicle to function as a running light and indicate that the vehicle is being operated and provide a reference point against which each of said wing signal lights may be seen and distinguished.

2. The structure of claim 1 wherein said outer wing light units are mounted on the outer ends of oppositely extending wings connected to said center light unit.

3. The structure of claim 1 wherein said housing is unitary and said light units are each mounted in pods, said center pod including a mounting base secured to the forward top side of the roof of said vehicle and said vehicle being a passenger automobile, and said housing being oriented with its longitudinal axis extending perpendicularly to the longitudinal axis of said automobile.

4. The structure of claim 4 wherein said outer wing signal lights provide a different color light from said center signal lights.

5. The structure of claim 2 wherein said wings extend outwardly and upwardly from said center unit.

6. The structure of claim 2 wherein said wings extend outwardly, upwardly and rearwardly from said center unit.

7. The structure of claim 6 wherein said housing is unitary and said light units are each mounted in pods having a cross-sectional thickness greater than the cross-sectional thickness of said wings.

8. The structure of claim 7 wherein each of said light units are mounted in an opening extending therethrough and each of said openings have parallel axes extending longitudinally of the longitudinal axis of said housing.

9. The structure of claim 8 wherein said center pod includes a mounting base securing said housing to said vehicle.

10. The structure of claim 3 wherein said wings extend outwardly, upwardly and rearwardly from said center pod.